US012571943B2

(12) United States Patent
Frey

(10) Patent No.: US 12,571,943 B2
(45) Date of Patent: Mar. 10, 2026

(54) ELECTRONIC LENS, ELECTRONIC DEVICE AND METHOD

(71) Applicant: Sony Group Corporation, Tokyo (JP)

(72) Inventor: Matthias Frey, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 1064 days.

(21) Appl. No.: 17/632,237

(22) PCT Filed: Aug. 21, 2020

(86) PCT No.: PCT/EP2020/073481
§ 371 (c)(1),
(2) Date: Feb. 2, 2022

(87) PCT Pub. No.: WO2021/032877
PCT Pub. Date: Feb. 25, 2021

(65) Prior Publication Data
US 2022/0221622 A1 Jul. 14, 2022

(30) Foreign Application Priority Data
Aug. 22, 2019 (EP) ..................................... 19193139

(51) Int. Cl.
*G02B 3/14* (2006.01)
*G06F 3/01* (2006.01)
*G06F 3/041* (2006.01)

(52) U.S. Cl.
CPC .............. *G02B 3/14* (2013.01); *G06F 3/017* (2013.01); *G06F 3/0412* (2013.01)

(58) Field of Classification Search
CPC ......... G02B 3/14; G06F 3/017; G06F 3/0412; G06F 3/04883; G06F 3/044
See application file for complete search history.

(56) References Cited

U.S. PATENT DOCUMENTS

| | | | |
|---|---|---|---|
| 6,864,951 | B1 | 3/2005 | Ren |
| 10,033,917 | B1 | 7/2018 | Silverstein |
| 2012/0086647 | A1 | 4/2012 | Birkler |
| 2014/0043255 | A1 | 2/2014 | Liu |
| 2015/0311029 | A1 | 10/2015 | Yamazaki |

(Continued)

FOREIGN PATENT DOCUMENTS

| | | |
|---|---|---|
| CN | 103455257 A | 12/2013 |
| CN | 105917270 A | 8/2016 |

(Continued)

OTHER PUBLICATIONS

International Search Report and Written Opinion mailed on Oct. 19, 2020, received for PCT Application PCT/EP2020/073481, Filed on Aug. 21, 2020, 10 pages.

(Continued)

*Primary Examiner* — Abhishek Sarma
(74) *Attorney, Agent, or Firm* — XSENSUS LLP

(57) ABSTRACT
The present disclosure pertains to an electronic lens including a control and a liquid lens area. The liquid lens area includes a liquid lens layer configured to provide a lens portion in response to an electric signal applied to the liquid lens area. The control is configured to obtain a touch operation on a touch screen and to apply, in response to the obtained touch operation, an electric signal to the liquid lens area for providing the lens portion.

20 Claims, 3 Drawing Sheets

(56)                    References Cited

U.S. PATENT DOCUMENTS

| | | | | |
|---|---|---|---|---|
| 2020/0192080 A1* | 6/2020 | Karam | ............... | G02B 13/0075 |
| 2020/0319380 A1* | 10/2020 | Kaminski | ................ | G02B 3/14 |

FOREIGN PATENT DOCUMENTS

| | | | |
|---|---|---|---|
| CN | 206025860 | U | 3/2017 |
| CN | 109425918 | A | 3/2019 |
| EP | 3496384 | A1 | 6/2019 |
| WO | 2019/046718 | A2 | 3/2019 |
| WO | 2019/099648 | A1 | 5/2019 |

OTHER PUBLICATIONS

Chen Mei, Wang Jian; "Implementation of lens imaging system based on VC++ Electronic technology", Sep. 25, 2012, 3pgs.
Harry E. Milton et al, "Electronic liquid crystal contact lenses for the correction of presbyopia Optics Express", Mar. 28, 2014, 6pgs.

\* cited by examiner 21, 31

15

```
┌─────────────────────────────────────────────────────────┐
│                                                         │
│  OBTAINING A TOUCH OPERATION ON A TOUCH SCREEN 41        │
│                                                         │
└─────────────────────────────────────────────────────────┘

┌─────────────────────────────────────────────────────────┐
│      APPLYING, IN RESPONSE TO THE OBTAINED TOUCH         │
│  OPERATION, AN ELECTRIC SIGNAL TO THE LIQUID LENS        │
│     AREA FOR PROVIDING THE LENS PORTION 42               │
└─────────────────────────────────────────────────────────┘

┌─────────────────────────────────────────────────────────┐
│  CONTROLLING AT LEAST ONE OF THE AMPLITUDE AND           │
│   POLARITY OF THE ELECTRIC SIGNAL APPLIED TO THE         │
│             LIQUID LENS AREA 43                          │
└─────────────────────────────────────────────────────────┘

┌─────────────────────────────────────────────────────────┐
│  APPLYING THE ELECTRIC SIGNAL IN A REGION OF THE         │
│   LIQUID LENS AREA CORRESPONDING TO A TOUCH              │
│  POSITION INCLUDED IN THE TOUCH OPERATION 44             │
└─────────────────────────────────────────────────────────┘
```

Fig. 6

ELECTRONIC LENS, ELECTRONIC DEVICE AND METHOD

CROSS-REFERENCE TO RELATED APPLICATIONS

The present application is based on PCT filing PCT/EP2020/073481, filed Aug. 21, 2020, which claims priority to EP 19193139.3, filed Aug. 22, 2019, the entire contents of each are incorporated herein by reference.

TECHNICAL FIELD

The present disclosure generally pertains to an electronic lens and an electronic device with an electronic lens and a method for controlling an electronic lens.

TECHNICAL BACKGROUND

Conventional magnifying glasses, e.g. hand lenses, typically have a convex optical lens to produce a magnified image of a physical object when placed between the object and a user's eyes. In such case, the distance of the hand lens from the object is less than the focal length of the optical lens. Such a hand lens can have a diameter of several centimeters, may be comparable heavy and generally a fixed to focal length.

Moreover, liquid lenses with adjustable focal length are known, which typically include two immiscible liquids having a different refractive index. The shape and curvature of the liquid-liquid interface, which determines the refraction and, thus, the lens property, is controllable by electric signals, whereby the focal length of the liquid lens is changeable.

A known mechanism for controlling the liquid lens by electric signals is dielectrophoresis, wherein the two liquids have different permittivity and therefore experience different forces in an electric field, which can be used to control the size and shape of the liquid-liquid interface (e.g. glycerol-oil-mixture). Another mechanism is electrowetting, wherein the wettability of a surface, for a specific liquid, depends on an applied voltage, whereby the contact angle at the surface is controlled and, thus, the size and shape of liquid-liquid interface (e.g. water-oil-mixture).

Although there exist techniques for magnifying an image of a physical object, it is generally desirable to provide an electronic lens and an electronic device for magnifying an image of a physical object and a method for controlling such an electronic lens.

SUMMARY

According to a first aspect the disclosure provides an electronic lens, comprising a control; a liquid lens area, including a liquid lens layer configured to provide a lens portion in response to an electric signal applied to the liquid lens area; wherein the control is configured to obtain a touch operation on a touch screen; and apply, in response to the obtained touch operation, an electric signal to the liquid lens area for providing the lens portion.

According to a second aspect the disclosure provides an electronic device, comprising a touch screen; and an electronic lens, including a control; a liquid lens area, including a liquid lens layer configured to provide a lens portion in response to an electric signal applied to the liquid lens area; wherein the control is configured to obtain a touch operation on the touch screen; and apply, in response to the obtained touch operation, an electric signal to the liquid lens area for providing the lens portion.

According to a third aspect the disclosure provides a method for controlling an electronic lens, comprising a control; a liquid lens area, including a liquid lens layer configured to provide a lens portion in response to an electric signal applied to the liquid lens area; the method including obtaining a touch operation on a touch screen; and applying, in response to the obtained touch operation, an electric signal to the liquid lens area for providing the lens portion.

Further aspects are set forth in the dependent claims, the following description and the drawings.

BRIEF DESCRIPTION OF THE DRAWINGS

Embodiments are explained by way of example with respect to the accompanying drawings, in which:

FIG. 5 illustrates a pixel control included in a control; and

FIG. 6 shows a flowchart of a method for controlling an electronic lens.

DETAILED DESCRIPTION OF EMBODIMENTS

Figure 1:
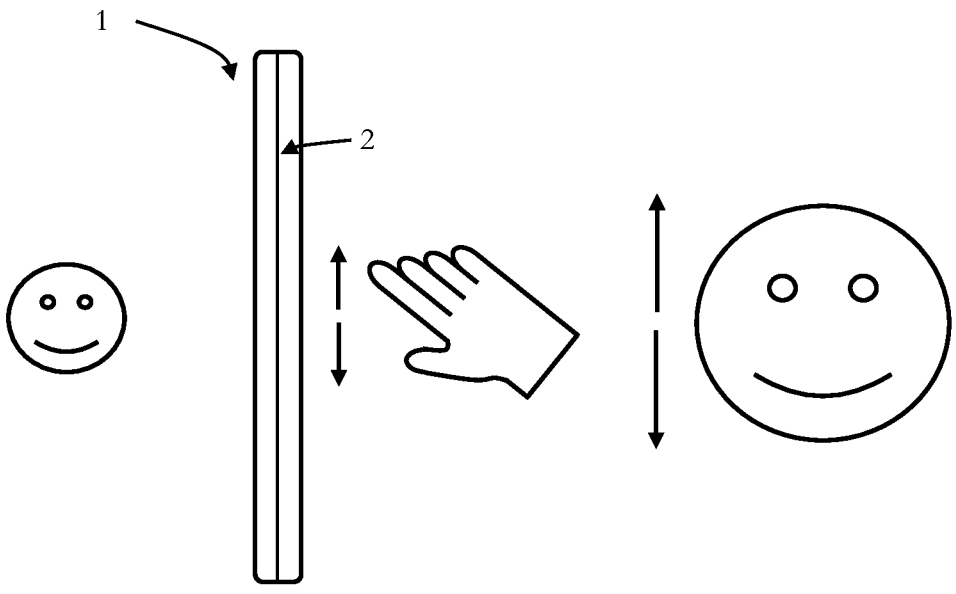
FIG. 1 illustrates a schematic principle of the function of an electronic device.

Before a detailed description of the embodiments under reference of FIG. 1 is given, general explanations are made.

As mentioned in the outset, it is recognized that it is desirable to provide an electronic lens and an electronic device for magnifying an image of a physical object. A known type of lenses controllable by electric signals is, as mentioned, a liquid lens which has an adjustable focal length according to an applied electric signal.

Current smartphones and other mobile electronic devices typically include a touch screen, which can be, for instance, a flat and lightweight transparent touch screen. Touch operations are very common due to the widespread use of mobile devices such as tablets and smartphones. For example, tablets and smartphones introduce the pinch-zoom gesture, for instance, to enlarge (or demagnify) text passes or parts of an image displayed on the screen. Nowadays, as people are used to this gesture based technology they even may try to use the pinch-zoom gesture on physical objects to zoom into images or texts that they are looking at.

Thus, it has been recognized that it may be desirable to bring the pinch-zoom gesture to real life in an electronic device, which people may use to read newspapers and magazines easily, allowing them to enlarge certain parts of what they are trying to read.

Moreover, it has been recognized that an electronic lens may be used in such an electronic device, which may be something like a transparent tablet that let users magnify parts of the physical object that lies below the transparent tablet, for example, by zooming in with a pinch-zoom gesture.

Hence, some embodiments pertain to an electronic lens, including a control and a liquid lens area. The liquid lens area includes a liquid lens layer configured to provide a lens portion in response to an electric signal applied to the liquid lens area. The control is configured to obtain a touch operation on a touch screen and to apply, in response to the obtained touch operation, an electric signal to the liquid lens area for providing the lens portion.

The electronic lens may be a lens device to provide a lens controllable by electric signals, wherein the electronic lens includes a control and a liquid lens area. It may be a standalone device or it may be included in another electronic device, such as a tablet computer, smartphone, personal digital assistant, etc.

The control may include electronic circuitry such as a microprocessor and memory and the like to achieve the functions described herein. The electronic circuitry may include electric components for implementing the functions as discussed herein.

The liquid lens area may be an area of the electronic lens to which an electric signal is applied for providing a lens portion, as will be discussed in more detail below. Hence, the liquid lens area may be part of the electronic lens, a part of a surface of the electronic lens, a layer of the electronic lens, etc. Generally, it may be an area at which the lens function may be provided.

Moreover, the liquid lens area includes a liquid lens layer, which provides a lens portion in response to an electric signal applied to the liquid lens area. The liquid lens layer can include, for example, a mixture of two immiscible liquids, i.e. deformable liquid, forming a liquid-liquid interface, which may also be a suspension, having a different refractive index (e.g. a mixture of water and oil or glycerol and oil). The oil may be an optical oil.

As discussed-above, the shape and curvature of the liquid-liquid interface of the two immiscible liquids, i.e. deformable liquid, is controllable by electric signals, thereby providing a lens portion with adjustable focal length. The electric signal may be an electrical voltage (current) applied to electrical contacts, which can be part of the liquid lens area, and may be in contact with the liquid lens layer.

The lens portion may be based, as mentioned-above, on the electrowetting phenomenon, wherein, for a specific liquid, the wettability of a surface depends on the applied voltage and the liquid-liquid interface deforms in response to the electrical field induced by the electrical voltage.

The control obtains a touch operation performed on a touch screen. Here, obtaining a touch operation may be understood as receiving a notification or touch operation data, or the like, indicating that a touch operation is performed or has been performed on the touch screen and receiving the touch operation data, i.e. information, which may describe or may be indicative of the performed touch operation (e.g. a gesture, a position, a track, etc.). For example, the data may include information about the position of the touch operation on the touch screen (e.g. pixel coordinates or the like), i.e. the touch position, or, for instance, the pixel coordinates of the fingers on the touch screen recorded over a certain amount of time or the like. Generally, the touch operation may be performed with an operation tool, such as an operation stick, pen or the like or even with a body part of the user, such as a finger.

Moreover, the control may obtain the touch operation from a touch control, which can be part of the touch screen being connected with the control or it may be a unit in the control or it may be a separate control in an electronic device.

For example, the touch operation may be a tap or a press on the touch screen with a finger, a pinch-zoom touch gesture, a drag or a rotation or the like.

Furthermore, the above-mentioned touch operation(s) may be performed in proximity of the touch screen, which may be detected by a proximity sensor (e.g. capacitive or photoelectric proximity sensor). Thus, the touch operation may not require a direct touch contact of, for example, the fingers with the touch screen. The formulation a touch operation performed on the touch screen may, therefore, account herein for a touch operation performed in contact with and in proximity to the touch screen.

The touch screen can be based on any type of known touch screen technology (e.g. optical, capacitive, resistive, inductive or the like), which is at least partly transparent, for example, a flexible transparent polymer based organic touch screen or the like. As discussed-above, the touch screen may be a proximity touch screen.

In some embodiments, the liquid lens area and the touch screen area at least partially overlap each other such that the region in which touch operations can be performed on the touch screen at least partially coincides with the region in which a liquid lens can be performed. In other words, in some embodiments the liquid lens area and the touch screen both may have the shape of a layer (e.g. rectangular, without limiting the present disclosure in that regard), wherein the touch screen layer is located on top of the liquid lens area.

The control applies the electric signal to the liquid lens area in response to the obtained touch operation. When, for example, a user taps the touch screen or the user performs a pinch-zoom touch gesture on the touch screen, the control obtains a notification (or touch operation data, or the like) that a touch operation is performed and additionally it may obtain (receive) touch operation data describing details of the performed touch operation, for instance, from a touch control as mentioned-above. In such embodiments, in response to the performed touch operation, an electric signal is applied to the liquid lens area to provide the lens portion.

The deformation of the liquid-liquid interface, due to the applied electric signal, is such that an image of parts of an object lying below the (transparent) touch screen appears magnified to a user above the touch screen. The focal length is adjusted (whereby the magnification changes) according to the electric signal, wherein the amplitude and/or the polarity of the electric signal may be set in advance or in accordance with the touch operation.

Hence, the electronic lens functions as a transparent touch sensitive magnifying glass, which is flat and lightweight with adjustable focal length, and intuitively operable by common touch operations.

In some embodiments, the control is further configured to control at least one of the amplitude and polarity of the electric signal applied to the liquid lens area according to the touch operation.

Here, controlling at least one of the amplitude and polarity of the electric signal may, for example, include setting the amplitude and polarity of an electric voltage or the like.

The amplitude of the electric signal may be the amplitude of an applied electric voltage such as 1 V, 5 V, 10 V, 20 V or the like. The polarity of the electric signal may be the sign of the applied electric voltage such as +5 V or −5 V or the like.

For example, when a user presses on the touch screen for a certain amount of time, the touch operation includes data, i.e. information, about the amount of time, then the control may control the amplitude and/or polarity of the electric signal in accordance with the amount of time the user pressed on the touch screen. Thereby, for instance, the magnification of an image of a physical object lying below the touch screen may be lower or higher.

In some embodiments, the touch operation includes a touch position and the electric signal is applied in a region of the liquid lens area corresponding to the touch position (touch operation data indicating the touch operation may also be indicative of the touch position).

The obtained touch operation includes touch operation data, i.e. information, e.g. about a user's touch position on the touch screen (e.g. pixel coordinates), for example, the position of a tap or the center of a pinch-zoom touch gesture. In the case of a pinch-zoom touch gesture, the touch operation data may include the distance between the two fingers end positions on the touch screen and the center of the pinch-zoom touch gesture may be in the middle of the distance, which may then be the touch position.

In some embodiments, a region on the touch screen (e.g. given by a plurality of pixel coordinates) is associated with a region of the liquid lens area.

For example, the region of the liquid lens area corresponding to the touch position may then include the region of the liquid lens area associated with the pixel coordinates of the touch position on the touch screen.

Thus, the electric signal is applied in the region of the liquid lens area associated with the pixel coordinates of the touch position on the touch screen.

In other embodiments, the region of the liquid lens area may be the region around the corresponding touch position within a predetermined square or in the case of the pinch-zoom touch gesture the region may be a circle having, for example, a diameter according to the distance between the two finger end positions on the touch screen.

Assuming exemplarily, a touch operation such as a tap occurred in the center of the touch screen is performed, then the control obtains the information that the touch position of the touch operation is in the center of the touch screen. Accordingly, the electric signal is applied in the center region of the liquid lens area corresponding to the touch position and, thus, the lens portion is provided in the center region of the touch screen. Thereby, only objects lying below the center region of the touch screen appear magnified to the user.

In some embodiments, the touch operation includes a touch gesture or the control is further configured to obtain a gesture and the electric signal is applied according to the touch gesture or the obtained gesture.

As mentioned, the obtained touch operation may include touch operation data, i.e. information, e.g. about a user's touch gesture on the touch screen (e.g. pixel coordinates of fingers recorded within a certain amount of time).

The touch gesture may be a pinch-zoom touch gesture or the like. When, for example, the control obtains a pinch-zoom touch gesture included in the touch operation, the electric signal is applied according to the pinch-zoom touch gesture. Then, the touch gesture (data) includes information, for instance, about the diameter and the center position of the pinch-zoom touch gesture and applies the electric signal according to this information.

For example, the electric signal is applied in the region corresponding to the center position (touch position), for instance, in the upper left region of the touch screen, and the amplitude of the electric signal may be controlled according to the diameter of the pinch-zoom touch gesture. Thereby, only objects lying below the upper left region of the touch screen appear magnified to the user with a magnification according to the diameter of the pinch-zoom gesture.

The control may obtain a gesture by, for example, a camera, which may be included in the touch screen being capable of acquiring photographic images of the user, and, for instance, a touch control may then send information about the recognized gesture in the photographic images to the control.

Exemplarily, the control may obtain a pinch-zoom gesture performed in the air by the user while tapping additionally at a position on the touch screen. Then, the electric signal is applied according to the pinch-zoom gesture performed in the air in the region of the touch screen corresponding to the touch position. Thereby, only objects lying below the region corresponding to the touch position appear magnified to the user.

Hence, in some embodiments, the touch gesture is a pinch-zoom touch gesture.

In some embodiments, the liquid lens area includes electrical contacts covered with an insulating layer for applying the electric signal.

The electrical contacts may be of any type of conductive material such as indium tin oxide (ITO), metals (e.g. gold, silver, aluminum, copper or the like), conductive polymers, graphite, semiconductors or the like or a combination thereof.

The number of electrical contacts can be two, three, four or more such that when the electric signal is applied the lens portion is provided in the liquid lens layer in accordance with the applied electric signal. The electrical contacts may be small regions of conductive material, wherein the size and shape of the electrical contacts is not limited to a specific shape and structure.

The insulating layer may be of any type of insulating material such as glass, ceramic, porcelain, aluminum oxide, polymethyl methacrylate (PMMA), composite polymer materials or the like or a combination thereof.

As discussed, the electric signal (i.e. electrical voltage) may be applied to electrical contacts to provide the lens portion in the liquid lens layer by, for example, utilizing the electrowetting phenomenon to deform the liquid-liquid interface of a e.g. water-oil-mixture.

In some embodiments, the liquid lens layer is arranged between the electrical contacts.

The liquid lens layer arranged between the electrical contacts may be in contact with the insulating layer of each of the electrical contacts.

In some embodiments, the liquid lens area includes a first electric layer covered with an insulating layer and a second electric layer covered with an insulating layer.

The electric layers may be a thin layer of electrical contacts covered with an insulating material, for example, which may be an electric grid. The electric layers may have the same size and shape as the touch screen. However, the electric layers are not limited to this.

Hence, in some embodiments, the first electric layer and the second electric layer have an electric grid.

The electric grid may be a mesh of thin (metal/electric conductive, e.g. iron, Copper, Wolfram, an alloy, or the like) wires and the insulating layer may be a separate layer or each of the wires may be covered with an insulating layer or the electrical grid may be woven in the insulating layer. The electric grid may be based on a regular pattern, including e.g. multiple parallel wires in a horizontal direction and multiple parallel wires in a vertical direction, wherein a spacing between the wires may be constant and equal or non-equal for vertical and horizontal wires (whereby a quadratic cell is provided between two adjacent horizontal and vertical wires). Of course, the present disclosure is not limited to such a grid, and the multiple wires of the grid may form other shapes and cells (e.g. a polygon, trapezoid, etc.).

Furthermore, the electric grid may be structured such that the liquid lens area is at least partly transparent.

Moreover, the electric grid may be divided into small segments electrically isolated from each other, but each connected to the control or a pixel control which may be included in the control.

Additionally, the liquid lens area may include a second liquid lens layer and a third electric layer, wherein the second liquid lens layer may be arranged between the second electric layer and the third electric layer. The third electric layer may also include an electric grid.

In such embodiments, the control may control the electric signal applied to the first electric layer, the second electric layer and the third electric layer such that, for example, the voltage between the first electric layer and the second electric layer and the voltage between the second electric layer and the third electric layer is of same amplitude, but of different polarity. Thereby, the provided lens portion is symmetric around the second electric layer.

In some embodiments, the liquid lens layer is arranged between the first electric layer and the second electric layer.

For example, the liquid lens layer can be a continuous layer of a deformable liquid (e.g. including a water-oil-mixture or the like) sandwiched between the first and second electric grid to provide the lens portion.

In some embodiments, the electric signal is applied to the electric grid of the first electric layer and the second electric layer in the region corresponding to the touch position.

As discussed-above, the touch operation includes a touch position and the control applies an electric signal in the region corresponding to the touch position. For example, the electric signal (i.e. electrical voltage) is applied in the region of the electric grids corresponding to the touch position, wherein the control may include a pixel control for that purpose.

The voltage applied on the electric grids in the region is such that the lens portion is provided, for example, having its center corresponding to the touch position and a diameter corresponding to, for instance, a preset diameter or the diameter of a pinch-zoom touch gesture. Thereby, only objects lying below the region corresponding to the touch position appear magnified to the user.

In some embodiments, the liquid lens area includes at least one liquid lens pixel.

The liquid lens area may be divided into smaller liquid lens pixels arranged in a matrix (or array), for example, the number of pixels may be six, nine or twelve or the like, wherein each liquid lens pixel corresponds to a region on the touch screen.

In some embodiments, each liquid lens pixel includes at least two electrical contacts covered with an insulating layer for applying the electric signal and a liquid lens layer and wherein the liquid lens layer is arranged between the electrical contacts.

For example, the electrical contacts of the liquid lens pixel may be small regions of conductive material or electric layers having a grid structure.

Hence, each of the liquid lens pixels may provide the liquid lens portion.

In some embodiments, the electric signal is applied to a liquid lens pixel located in the region corresponding to the touch position.

As discussed, the touch operation includes a touch position and when, for instance, the user taps the center part on the touch screen the liquid lens pixel corresponding to the center part of the touch screen provides the lens portion, wherein the control may include a pixel control for that purpose. Thereby, only objects lying below the region corresponding to the touch position appear magnified to the user.

In some embodiments, as mentioned, the liquid lens layer includes a deformable liquid, wherein the deformable liquid may include a water-oil-mixture or a glycerol-oil-mixture, as mentioned.

Some embodiments pertain to an electronic device, e.g. a smartphone or a tablet or a wearable device, including a touch screen and an electronic lens as discussed herein. The electronic lens, as described herein, includes a control and a liquid lens area, wherein the liquid lens area includes a liquid lens layer which provides a lens portion in response to an electric signal applied to the liquid lens area and the control obtains a touch operation on the touch screen and applies, in response to the obtained touch operation, an electric signal to the liquid lens area for providing the lens portion.

Some embodiments pertain to a method for controlling an electronic lens as described herein, the method including obtaining a touch operation on a touch screen and applying, in response to the obtained touch operation, an electric signal to the liquid lens area for providing the lens portion.

In some embodiments, the method for controlling an electronic lens further includes controlling at least one of the amplitude and polarity of the electric signal applied to the liquid lens area according to the touch operation, as discussed.

In some embodiments, the method for controlling an electronic lens further includes applying the electric signal in a region of the liquid lens area corresponding to a touch position included in the touch operation, as discussed.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is shown a schematic principle of the function of an embodiment of an electronic device 1.

The electronic device 1 is used to magnify an image of a physical object lying below the electronic device 1 upon a touch operation of a user is performed on the touch screen 2 included in the electronic device 1.

Figure 2:
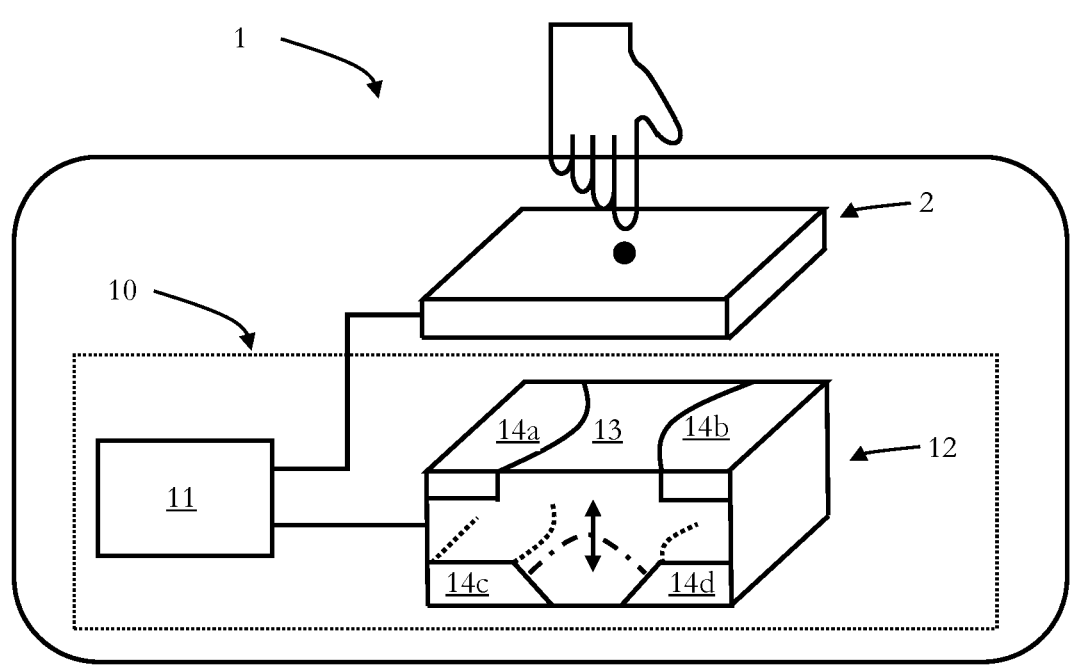
FIG. 2 illustrates a first embodiment of an electronic lens included in an electronic device.
Figure 3:
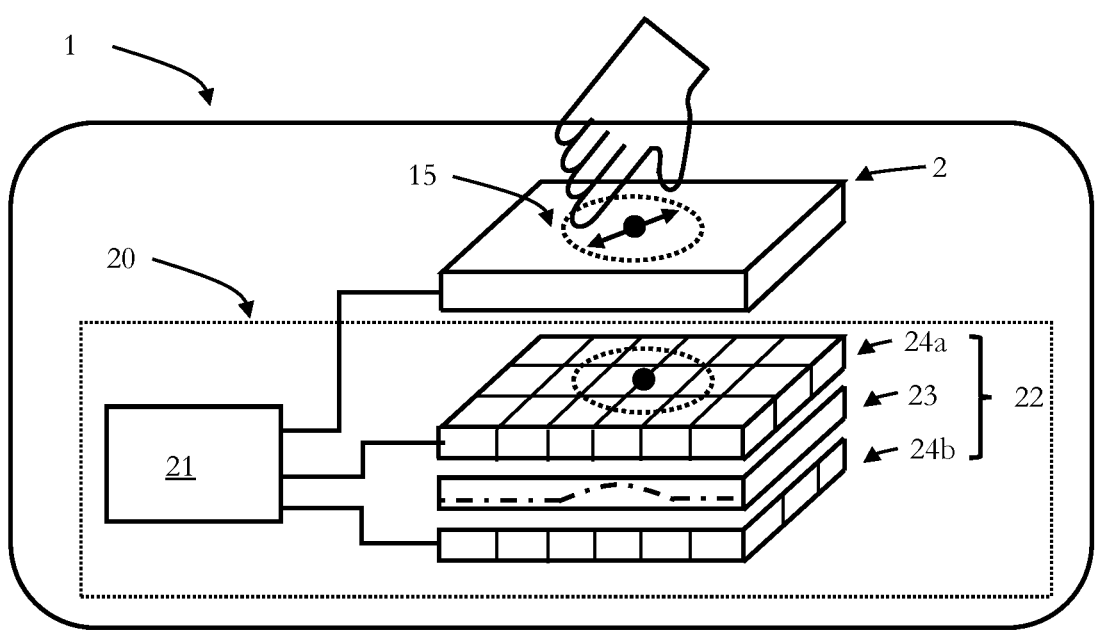
FIG. 3 illustrates a second embodiment of an electronic lens included in an electronic device.
Figure 4:
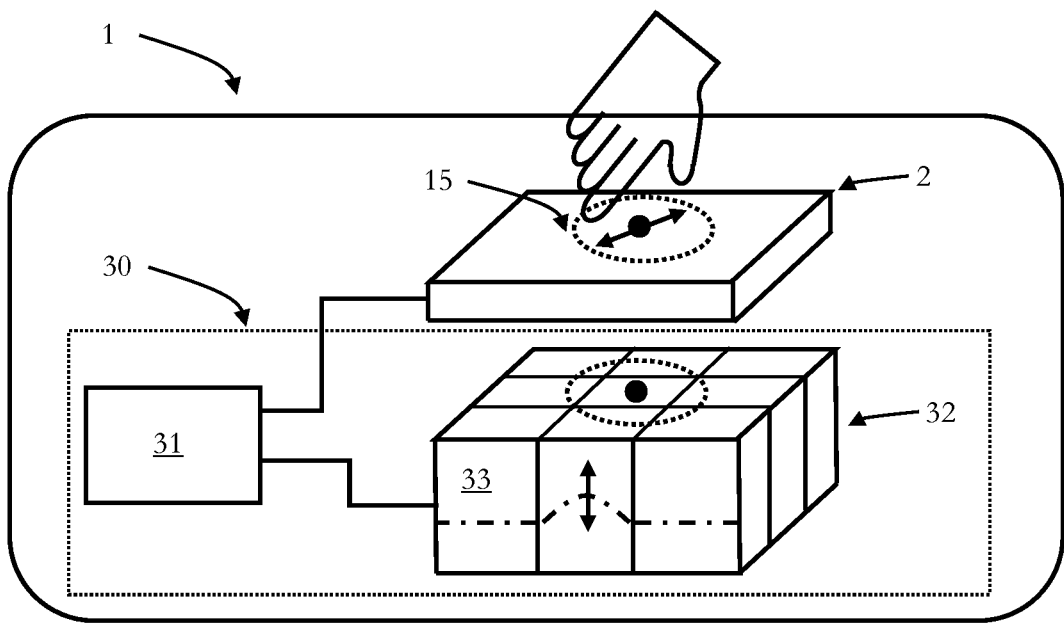
FIG. 4 illustrates a third embodiment of an electronic lens included in an electronic device.

In FIG. 2, FIG. 3 and FIG. 4 a first, a second and a third embodiment of an electronic lens 10, 20 and 30 included in the electronic device 1 will be described.

In FIG. 2, FIG. 3 and FIG. 4, a control 11, 21 and 31 is shown as being connected to a touch screen 2, however, a touch control, as discussed-above, can be part of the touch screen 2 or it may be a separate touch control in the electronic device 1. The touch screen 2 and the electronic lens 10, 20 and 30 are shown as separate entities for illustration, but can be attached to each other. Furthermore, the dimensions of the thickness of the touch screen 2 and the thickness of the electronic lens 10, 20 and 30 are not necessarily true to scale.

FIG. 2 illustrates the first embodiment of an electronic lens 10 included in the electronic device 1 having the touch screen 2, which is configured as a capacitive touch screen and which provides touch operation data to a control 11 of the electronic lens 10 in response to a touch operation performed on the touch screen 2.

The electronic lens 10 has the control 11, which obtains the touch operation performed on the touch screen 2, here, the user presses on the touch screen as illustrated by the black circle, via a signal connection between the control 11 and the touch screen 2.

In response to the received touch operation, the control 11 for the electronic lens 10 generates and applies an electric signal to a liquid lens area 12, wherein the liquid lens area 12 includes a liquid lens layer 13 and electrical contacts 14a-14d. As mentioned, the electric signal (i.e. voltage) is applied to the electrical contacts 14a-14d, which are covered by an insulating layer (not shown).

The liquid lens area 12 and the touch screen 2 each have a rectangular form and they are located adjacent to each other (on top of each other) such that the main surface of the touch screen 2 is directly located on the main surface of the liquid lens area 12 (FIG. 2 illustrates the touch screen 2 and the liquid lens area 12 spaced from each other for illustration purposes only).

As discussed-above, the structure of the electrical contacts 14a-14d according to the embodiment illustrated in FIG. 2 is not limited to this specific structure and the number of electrical contacts 14a-14d is not limited to four.

Once the electric signal is applied to the liquid lens area 12, the liquid-liquid interface of two immiscible liquids (deformable liquid), here a water-oil-mixture, in the liquid lens layer 13, which is arranged between the electrical contacts 14a-14d, deforms as the contact angle of the interface on the electrical contacts 14a-14d changes with the electric signal. Thereby, the curvature of the liquid-liquid interface changes, as illustrated in FIG. 2 by the arrow, providing a lens portion (dashes-dotted line) in the liquid lens layer 13 due to the two different refractive indices of the liquids.

As discussed, the control 11 controls the amplitude and/or polarity of the electric signal according to the touch operation such that the lens portion is provided in the liquid lens layer 13 and parts of an physical object lying below the electronic device 1 are magnified.

In the embodiment illustrated in FIG. 2, the electric signal is set in accordance with the amount of time the user presses on the touch screen 2, such that the liquid-liquid interface deforms more or less (illustrated in FIG. 2 by the arrow) dependent on how long the user presses on the touch screen.

FIG. 3 illustrates the second embodiment of an electronic lens 20 included in the electronic device 1 having a touch screen 2, which is configured as a capacitive touch screen and which provides touch operation data to a control 21 of the electronic lens 20 in response to a touch operation performed on the touch screen 2, via a signal connection between the control 21 and the touch screen 2. The obtained touch operation data includes information about the user's touch position and touch gesture.

In the embodiment illustrated in FIG. 3, the touch gesture is a pinch-zoom touch gesture and the touch operation data includes the distance between the end positions of the two fingers of the user on the touch screen 2 and the touch position corresponds to the center of the pinch-zoom touch gesture (illustrated by the black circle).

The pinch-zoom touch gesture defines a region 15 on the touch screen 2. Here, the region is a circle around the touch position, wherein the diameter corresponds to the distance between the two finger end positions on the touch screen 2.

In response to the received touch operation, the control 21 for the electronic lens 20 generates and applies, as discussed, an electric signal to the liquid lens area 22, wherein the liquid lens area 22 includes a liquid lens layer 23, a first electric layer 24a and a second electric layer 24b. As mentioned, the electric signal (i.e. voltage) is applied to the first electric layer 24a and the second electric layer 24b, which are covered by an insulating layer (not shown).

In the embodiment illustrated in FIG. 3, the first electric layer 24a and the second electric layer 24b are an electric grid and the electric signal is applied in the region 15 corresponding to the region 15 on the touch screen 2.

The liquid lens area 22 and the touch screen 2 each have a rectangular form and they are located adjacent to each other (on top of each other) such that the main surface of the touch screen 2 is directly located on the main surface of the liquid lens area 22 (FIG. 3 illustrates the touch screen 2 and the liquid lens area 22 spaced from each other for illustration purposes only).

The control 21 includes a pixel control such that the control 21 addresses the electric grid only in the region 15 corresponding to the region 15 on the touch screen 2.

In accordance with the applied electric signal, the liquid-liquid interface of two immiscible liquids (deformable liquid), here a water-oil-mixture, in the liquid lens layer 23, which is arranged between the electric layers 24a and 24b, deforms only in the region 15 corresponding to the region 15 on the touch screen 2. The amount of deformation of the liquid-liquid interface in this embodiment is set in advance in the control 21.

Thus, the lens portion (dashes-dotted line) is provided in the region 15 of the liquid lens layer 23 and only the parts of a physical object lying below the region 15 are magnified.

FIG. 4 illustrates the third embodiment of an electronic lens 30 included in the electronic device 1 having a touch screen 2, which is configured as a capacitive touch screen and which provides touch operation data to a control 31 of the electronic lens 30 in response to a touch operation performed on the touch screen 2, via a signal connection between the control 31 and the touch screen 2. The obtained touch operation data includes information about the user's touch position and touch gesture.

In the embodiment illustrated in FIG. 4, the touch gesture is a pinch-zoom touch gesture and the touch operation data includes the distance between the end positions of the two fingers of the user on the touch screen 2 and the touch position corresponds to the center of the pinch-zoom touch gesture (illustrated by the black circle).

The pinch-zoom touch gesture defines a region 15 on the touch screen 2, wherein the region 15 is a circle around the touch position and the diameter corresponds to the distance between the two finger end positions on the touch screen 2.

In response to the received touch operation, the control 31 for the electronic lens 30 generates and applies, as discussed, an electric signal to the liquid lens area 32, wherein the liquid lens area 32 has liquid lens pixels 33 arranged in a matrix. Each liquid lens pixel includes electrical contacts 14a-14d (not shown) covered with an insulating layer (not shown) to which the electric signal is applied and a liquid lens layer 13, wherein the liquid lens layer 13 is arranged between the electrical contacts 14a-14d.

The liquid lens area 32 and the touch screen 2 each have a rectangular form and they are located adjacent to each other (on top of each other) such that the main surface of the touch screen 2 is directly located on the main surface of the liquid lens area 32 (FIG. 4 illustrates the touch screen 2 and the liquid lens area 32 spaced from each other for illustration purposes only).

In the embodiment illustrated in FIG. 4, the number of liquid lens pixels 33 is nine, but it is not limited to this specific number (as discussed). Then, the electric signal is applied to the liquid lens pixel 33 in the center of the region 15 corresponding to the touch position (black circle), wherein the control 31 includes a pixel control for that purpose.

In accordance with the applied electric signal, the liquid-liquid interface of two immiscible liquids (deformable liquid), here a water-oil-mixture, deforms only in the liquid lens pixel 33 in the center of the region 15 corresponding to the touch position (black circle).

Thus, the lens portion (dashes-dotted line) is provided in the liquid lens pixel 33 in the region 15 corresponding to the touch position and only parts of physical objects lying below the region 15 are magnified. The amount of deformation of the liquid-liquid interface is more or less (illustrated in FIG. 4 by the arrow) dependent on the diameter of the region 15 in this embodiment.

FIG. 5 illustrates a pixel control included in the control 21 and 31.

As discussed-above, the control 21 and 31 according to the second and third embodiment of the electronic lens includes a pixel control having a row pixel control 25 and a column pixel control 26.

The control 21 and 31 controls the electric signal generated and applied to the first electric layer 24a, the second electric layer 24b and the liquid lens pixel 33. Thus, the control applies the electric signal in the region 15 corresponding to the touch position on the touch screen 2 by the row pixel control 25 and the column pixel control 26.

FIG. 6 shows a flowchart of a method 40 for controlling an electronic lens, such as the electronic lens of FIG. 3 or any other electronic lens described herein. In the following, it is also referred to the embodiment of the electronic lens 20 of FIG. 3 without limiting the disclosure of the method 40 to this specific embodiment.

At 41 a control, such as the control 21, obtains a touch operation on a touch screen, such as the touch screen 2, as discussed.

At 42 the control 21, applies, in response to the obtained touch operation, an electric signal to the liquid lens area, such as the liquid lens area 22, for providing a lens portion, as discussed.

At 43 the control 21, controls at least one of the amplitude and polarity of the electric signal applied to the liquid lens area 22 according to the touch operation, as discussed.

At 44 the control 21, applies the electric signal in a region 15 of the liquid lens area 22 corresponding to a touch position included in the touch operation, as discussed.

All units and entities described in this specification and claimed in the appended claims can, if not stated otherwise, be implemented as integrated circuit logic, for example on a chip, and functionality provided by such units and entities can, if not stated otherwise, be implemented by software.

Note that the present technology can also be configured as described below.

(1) An electronic lens, including:
a control;
a liquid lens area, including:
  a liquid lens layer configured to provide a lens portion in response to an electric signal applied to the liquid lens area;
  wherein the control is configured to:
    obtain a touch operation on a touch screen; and
    apply, in response to the obtained touch operation, an electric signal to the liquid lens area for providing the lens portion.
(2) The electronic lens of (1), wherein the control is further configured to control at least one of the amplitude and polarity of the electric signal applied to the liquid lens area according to the touch operation.

(3) The electronic lens of (2), wherein the touch operation includes a touch position and wherein the electric signal is applied in a region of the liquid lens area corresponding to the touch position.

(4) The electronic lens of (3), wherein the touch operation includes a touch gesture or the control is further configured to obtain a gesture and wherein the electric signal is applied according to the touch gesture or the obtained gesture.

(5) The electronic lens according of (4), wherein the touch gesture is a pinch-zoom touch gesture.

(6) The electronic lens according of anyone of (2) to (5), wherein the liquid lens area further includes electrical contacts covered with an insulating layer for applying the electric signal.

(7) The electronic lens of (6), wherein the liquid lens layer is arranged between the electrical contacts.

(8) The electronic lens of anyone of (3) to (7), wherein the liquid lens area further includes:
a first electric layer covered with an insulating layer; and
a second electric layer covered with an insulating layer.
(9) The electronic lens of (8), wherein the first electric layer and the second electric layer have an electric grid.

(10) The electronic lens of (9), wherein the liquid lens layer is arranged between the first electric layer and the second electric layer.

(11) The electronic lens of (10), wherein the electric signal is applied to the electric grid of the first electric layer and the second electric layer in the region corresponding to the touch position.

(12) The electronic lens of anyone of (3) to (11), wherein the liquid lens area includes at least one liquid lens pixel.

(13) The electronic lens of (12), wherein each liquid lens pixel includes at least two electrical contacts covered with an insulating layer for applying the electric signal and a liquid lens layer and wherein the liquid lens layer is arranged between the electrical contacts.

(14) The electronic lens of (13), wherein the electric signal is applied to a liquid lens pixel located in the region corresponding to the touch position.

(15) The electronic lens of anyone of (1) to (14), wherein the liquid lens layer includes a deformable liquid.

(16) The electronic lens of (15), wherein the deformable liquid includes a water-oil-mixture or a glycerol-oil-mixture.

(17) An electronic device, including:
a touch screen; and
an electronic lens, including:
  a control; and
  a liquid lens area, including a liquid lens layer configured to provide a lens portion in response to an electric signal applied to the liquid lens area;
  wherein the control is configured to:
    obtain a touch operation on the touch screen; and
    apply, in response to the obtained touch operation, an electric signal to the liquid lens area for providing the lens portion.
(18) A method for controlling an electronic lens, including a control and a liquid lens area including a liquid lens layer configured to provide a lens portion in response to an electric signal applied to the liquid lens area the method including:
  obtaining a touch operation on a touch screen; and
  applying, in response to the obtained touch operation, an electric signal to the liquid lens area for providing the lens portion.
(19) The method for controlling an electronic lens of (18), wherein the method further includes:

controlling at least one of the amplitude and polarity of the electric signal applied to the liquid lens area according to the touch operation.

(20) The method for controlling an electronic lens of (19), wherein the method further includes:

applying the electric signal in a region of the liquid lens area corresponding to a touch position included in the touch operation.

(21) A computer program comprising program code causing a computer to perform the method according to anyone of (18) to (20), when being carried out on a computer.

(22) A non-transitory computer-readable recording medium that stores therein a computer program product, which, when executed by a processor, causes the method according to anyone of (18) to (20) to be performed.

The invention claimed is:

1. An electronic lens, comprising:
a control;
a liquid lens area, including:
a liquid lens layer configured to provide a lens portion in response to an electric signal applied to the liquid lens area;
wherein the control is configured to:
obtain a touch operation on a transparent touch screen, wherein the transparent touch screen and the liquid lens area are configured to be positioned between a user and a physical object to be viewed; and
apply, in response to the obtained touch operation on the transparent touch screen, an electric signal to the liquid lens area for providing the lens portion to magnify an image of the physical object through the transparent touch screen.

2. The electronic lens according to claim 1, wherein the control is further configured to control at least one of the amplitude and polarity of the electric signal applied to the liquid lens area according to the touch operation.

3. The electronic lens according to claim 2, wherein the touch operation includes a touch position and wherein the electric signal is applied in a region of the liquid lens area corresponding to the touch position.

4. The electronic lens according to claim 3, wherein the touch operation includes a touch gesture or the control is further configured to obtain a gesture and wherein the electric signal is applied according to the touch gesture or the obtained gesture.

5. The electronic lens according to claim 4, wherein the touch gesture is a pinch-zoom touch gesture.

6. The electronic lens according to claim 3, wherein the liquid lens area further includes:
a first electric layer covered with an insulating layer; and
a second electric layer covered with an insulating layer.

7. The electronic lens according to claim 6, wherein the first electric layer and the second electric layer have an electric grid.

8. The electronic lens according to claim 7, wherein the liquid lens layer is arranged between the first electric layer and the second electric layer.

9. The electronic lens according to claim 8, wherein the electric signal is applied to the electric grid of the first electric layer and the second electric layer in the region corresponding to the touch position.

10. The electronic lens according to claim 3, wherein the liquid lens area includes at least one liquid lens pixel.

11. The electronic lens according to claim 10, wherein each liquid lens pixel includes at least two electrical contacts covered with an insulating layer for applying an electric signal and a liquid lens layer, and wherein the liquid lens layer is arranged between the electrical contacts.

12. The electronic lens according to claim 11, wherein the electric signal is applied to a liquid lens pixel located in the region corresponding to the touch position.

13. The electronic lens according to claim 2, wherein the liquid lens area further includes electrical contacts covered with an insulating layer for applying the electric signal.

14. The electronic lens according to claim 13, wherein the liquid lens layer is arranged between the electrical contacts.

15. The electronic lens according to claim 1, wherein the liquid lens layer includes a deformable liquid.

16. The electronic lens according to claim 15, wherein the deformable liquid includes a water-oil-mixture or a glycerol-oil-mixture.

17. An electronic device, comprising:
a transparent touch screen; and
an electronic lens, including:
a control; and
a liquid lens area, including a liquid lens layer configured to provide a lens portion in response to an electric signal applied to the liquid lens area;
wherein the control is configured to:
obtain a touch operation on the transparent touch screen, wherein the transparent touch screen and the liquid lens area are configured to be positioned between a user and a physical object to be viewed; and
apply, in response to the obtained touch operation on the transparent touch screen, an electric signal to the liquid lens area for providing the lens portion to magnify an image of the physical object through the transparent touch screen.

18. A method for controlling an electronic lens, including a control and a liquid lens area including a liquid lens layer configured to provide a lens portion in response to an electric signal applied to the liquid lens area, the method comprising:
obtaining a touch operation on a transparent touch screen, wherein the transparent touch screen and the liquid lens area are configured to be positioned between a user and a physical object to be viewed; and
applying, in response to the obtained touch operation on the transparent touch screen, an electric signal to the liquid lens area for providing the lens portion to magnify an image of the physical object through the transparent touch screen.

19. The method for controlling an electronic lens according to claim 18, wherein the method further comprises:
controlling at least one of the amplitude and polarity of the electric signal applied to the liquid lens area according to the touch operation.

20. The method for controlling an electronic lens according to claim 19, wherein the method further comprises:
applying the electric signal in a region of the liquid lens area corresponding to a touch position included in the touch operation.

* * * * *